United States Patent [19]

Helf et al.

[11] Patent Number: 5,550,924

[45] Date of Patent: Aug. 27, 1996

[54] REDUCTION OF BACKGROUND NOISE FOR SPEECH ENHANCEMENT

[75] Inventors: Brant M. Helf, Melrose; Peter L. Chu, Lexington, both of Mass.

[73] Assignee: PictureTel Corporation, Danvers, Mass.

[21] Appl. No.: 402,550

[22] Filed: Mar. 13, 1995

Related U.S. Application Data

[63] Continuation of Ser. No. 86,707, Jul. 7, 1993, abandoned.

[51] Int. Cl.⁶ .................................................. H04B 15/00
[52] U.S. Cl. .............................. 381/94; 381/46; 381/47; 395/2.34; 395/2.35
[58] Field of Search .......................... 381/94, 46, 47; 395/2.34, 2.35

[56] References Cited

U.S. PATENT DOCUMENTS

| | | |
|---|---|---|
| 4,185,168 | 1/1980 | Graupe et al. . |
| 4,628,529 | 12/1986 | Borth et al. . |
| 4,630,304 | 12/1986 | Borth et al. . |
| 4,630,305 | 12/1986 | Borth et al. . |
| 4,653,102 | 3/1987 | Hansen . |
| 4,658,426 | 4/1987 | Chabries et al. . |
| 4,696,039 | 9/1987 | Doddington ......................... 381/46 |
| 4,852,175 | 7/1989 | Borth et al. . |
| 4,868,880 | 9/1989 | Bennett, Jr. . |
| 4,912,767 | 3/1990 | Chang . |
| 5,012,519 | 4/1991 | Adlersberg et al. . |
| 5,133,013 | 7/1992 | Munday . |

FOREIGN PATENT DOCUMENTS 3132221  5/1991  Japan ......................................... 381/94

*Primary Examiner*—Forester W. Isen
*Attorney, Agent, or Firm*—Fish & Richardson P.C.

[57] ABSTRACT

Properties of human audio perception are used to perform spectral and time masking to reduce perceived loudness of noise added to the speech signal. A signal is divided temporally into blocks which are then passed through notch filters to remove narrow frequency band components of the noise. Each block is then appended to part of the previous block in a manner which avoids block boundary discontinuities. An FFT is then performed on the resulting larger block, after which the spectral components of the signal are fed to a background noise estimator. Each frequency component of the signal is analyzed with respect to the background noise to determine, within various confidence levels, whether it is pure noise or a noise-and-signal combination. The frequency band's gain function is determined, based on the confidence levels. A spectral valley finder detects and fills in spectral valleys in the frequency component gain function, after which the function is used to modify the magnitude components of the FFT. An inverse FFT then maps the signal back from the frequency domain to the time domain to give a frame of noise-reduced signal. This signal is then multiplied by a temporal window and joined to the previous frame's signal to derive the output.

21 Claims, 3 Drawing Sheets

REDUCTION OF BACKGROUND NOISE FOR SPEECH ENHANCEMENT

This is a continuation of application Ser. No. 08/086,707, filed Jul. 7, 1993, now abandoned.

BACKGROUND OF THE INVENTION

This invention relates to communicating voice information over a channel such as a telephone communication channel.

Microphones used in voice transmission systems typically pick up ambient or background sounds, called noise, along with the voices they are intended to pick up. In voice transmission systems in which the microphone is at some distance from the speaker(s), for example, systems used in video and audio telephone conference environments, background noises are a cause of poor audio quality since the noise is added onto the speech picked up by a microphone. By their nature and intended use, these systems must pick up sounds from all locations surrounding their microphones, and these sounds will include background noise.

Fan noise, originating from HVAC systems, computers, and other electronic equipment, is the predominant source of noise in most teleconferencing environments.

A good noise suppression technique will reduce the perception of the background noise while simultaneously not affecting the quality or intelligibility of the speech. In general it is an object of this invention to suppress any constant noise, narrowband or wideband, that is added onto the speech picked up by a single microphone. It is a further object of this invention to reduce fan noise that is added onto the speech picked up by a single microphone.

SUMMARY OF THE INVENTION

In one aspect, generally, the invention relates to a device for reducing the background noise of an input audio signal. The device features a framer for dividing the input audio signal into a plurality of frames of signals, and a notch filter bank for removing components of noise from each of the frames of signals to produce filtered frames of signals. A multiplier multiplies a combined frame of signals to produce a windowed frame of signals, wherein the combined frame of signals includes all signals in one filtered frame of signals combined with some signals in the filtered frame of signals immediately preceding in time the one filtered frame of signals. A transformer obtains frequency spectrum components from the windowed frame of signals, and a background noise estimator uses the frequency spectrum components to produce a noise estimate of an amount of noise in the frequency spectrum components. A noise suppression spectral modifier produces gain multiplicative factors based on the noise estimate and the frequency spectrum components. A delayer delays the frequency spectrum components to produce delayed frequency spectrum components. A controlled attenuator attenuates the frequency spectrum components based on the gain multiplicative factors to produce noise-reduced frequency components, and an inverse transformer converts the noise-reduced frequency components to the time domain.

In preferred embodiments, the noise suppression spectral modifier includes a global decision mechanism, a local decision mechanism, a detector, a spreading mechanism, and a spectral valley filler.

The global decision mechanism makes, for each frequency component of the frequency spectrum components, a determination as to whether that frequency component is primarily noise. The local noise decision mechanism derives, for each frequency component of the frequency spectrum components, a confidence level that the frequency component is primarily a noise component. The detector determines, based on the confidence levels, a gain multiplicative factor for each frequency component. The spreading mechanism spectrally and temporally spreads the effect of the determined gain multiplicative factors, and the spectral valley filler detects and fills in spectral valleys in the resulting frequency components.

In other aspects of the preferred embodiment, the background noise estimator also produces a noise estimate for each frequency spectrum component, and the local noise decision mechanism derives confidence levels based on: ratios between each frequency component and its corresponding noise estimate, and the determinations made by the global decision mechanism.

In another aspect, the invention further features a post-window and an overlap-and-adder mechanism. The post-window produces smoothed time-domain components for minimizing discontinuities in the noise-reduced time-domain components; and the overlap-and-adder outputs a first portion of the smoothed time-domain components in combination with a previously stored portion of smoothed time-domain components, and stores a remaining portion of the smoothed frequency components, where the remaining portion comprises the smoothed frequency components not included in the first portion.

In preferred embodiments of the device, the background noise estimator includes at least two estimators, each producing a background noise estimate, and a comparator for comparing and selecting one of the background noise estimates. One of the estimators is a running minimum estimator, and the other estimator is a stationary estimator.

In preferred embodiments, the device also includes a notch filter mechanism for determining the locations of the notches for the notch filter bank.

DESCRIPTION OF THE PREFERRED EMBODIMENTS

Figure 1:
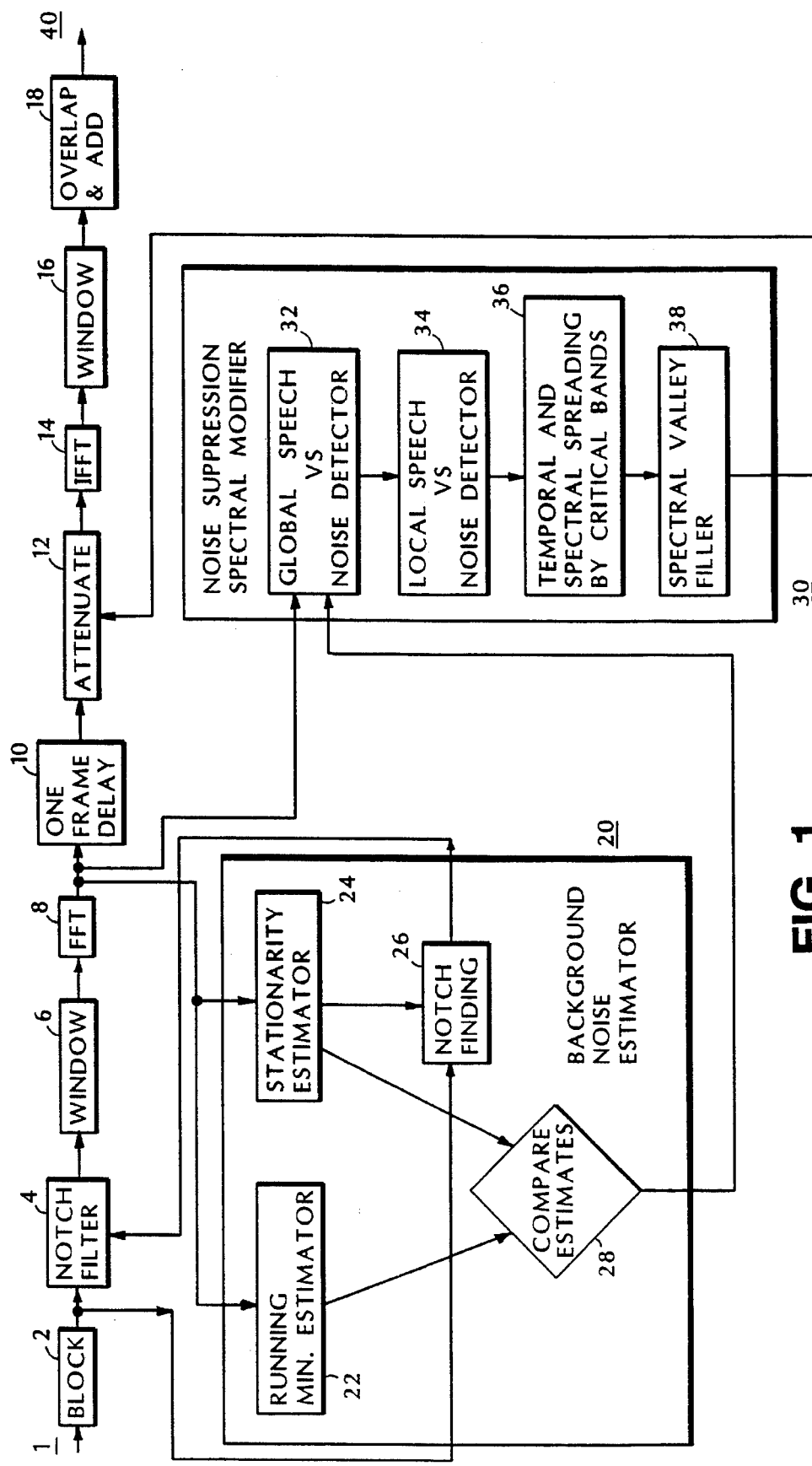
FIG. 1 is a block diagram of a noise suppression system according to the invention.

The simplest noise suppression apparatus, in daily use by millions of people around the world, is the so-called "squelch" circuit. A squelch circuit is standard on most Citizen Band two-way radios. It operates by simply disconnecting the system's loudspeaker when the energy of the received signal falls below a certain threshold. The value of this threshold is usually fixed using a manual control knob to a level such that the background noise never passes to the speaker when the far end is silent. The problem with this kind of circuit is that when the circuit turns on and off as the far end speaker starts and then stops, the presence and then absence of noise can be clearly heard. The noise is wideband and covers frequencies in which there is little speech energy, and thus the noise can be heard simultaneously as the person is talking. The operation of the squelch unit produces a very disconcerting effect, although it is preferable to having no noise suppression whatsoever.

The noise suppression method of this invention improves on the "squelch" concept considerably by reducing the background noise in both speech and non-speech sections of the audio.

The approach, according to the invention, is based on human perception. Using principles of spectral and time masking (both defined below), this invention reduces the perceived loudness of noise that is added onto or mixed with the speech signal.

This approach differs from other approaches, for example, those in which the goal is to minimize the mean-squared-error between the speech component by itself (speech-without-noise) and the processed speech output of the suppression system.

The method used in this invention exploits the "squelch" notion of turning up the gain on a channel when the energy of that channel exceeds a threshold and turning down the gain when the channel energy falls below the threshold, however the method performs the operation separately on different frequency regions. The gain on a channel can be considered to be the ratio between the volume of the input signal and the volume of the corresponding output signal.

The method further exploits various psychoacoustic principles of spectral masking, in particular the principles which basically state that if there is a loud tone at some frequency, then there exists a given frequency band around that frequency, called the critical band, within which other signals cannot be heard. In other words, other signals in the critical band cannot be heard. The method of the invention is far more effective than a simple "squelch" circuit in reducing the perception of noise while speech is being received from the far end.

The method of the invention also exploits a temporal masking property. If a loud tone burst occurs, then for a period of time up to 200 milliseconds after that burst the sensitivity of the ear in the spectral region of the burst is decreased. Another acoustic effect is that for a time of up to 20 milliseconds before the burst, the sensitivity of the ear is decreased (thus, human hearing has a pipeline delay of about 20 milliseconds). One key element of this invention is thus that the signal threshold below which the gain for a given band is decreased can be lowered for a period of time both before and after the occurrence of a sufficiently strong signal in that band since the ear's sensitivity to noise is decreased in that period of time.

System Overview

With reference now to the block diagram of FIG. 1, the input signal 1 is first apportioned by a framer 2 into 20 millisecond frames of samples. (Because the input signal is sampled at a rate of 16 kHz in the illustrated embodiment, each 20 ms frame includes 320 samples.) The computational complexity of the method is significantly reduced by operating on groups of frames of samples at a time, rather than on individual samples, one at a time. The framed signal is then fed through a bank of notch filters 4, the purpose of which is to remove narrow band components of the noise, typically motor noise occurring at the rotational frequencies of the motors. If the notches are narrow enough with a sparse enough spectral density, the tonal quality of the speech will not be adversely affected. Each frame of digital signals is then combined with a portion from the end of the immediately preceding frame of digital signals to produce a windowed frame.

In preferred embodiments, each frame of digital signals (20 ms) is combined with the last 12 ms of the preceding frame to produce windowed frames having durations of 32 ms. In other words, each windowed frame includes three hundred and twenty samples from a frame of digital signals in combination with the last one hundred and ninety-two filtered samples of the immediately preceding frame. The 512-sample segment of speech is then multiplied by a window, at a multiplier 6, to alleviate problems arising from discontinuities of the signal at the beginning and end of the 512 sample frame. A fast Fourier Transform (FFT) 8 is then taken of the 512 sample windowed frame, producing a 257 component frequency spectrum.

The lowest (D.C.) and highest (sampling frequency divided by two, or 8 kHz) frequency components of the transformed signal have real parts only, while the other 255 components have both real and imaginary parts. The spectral components are fed to a background noise estimator 20 whose purpose is to estimate the background noise spectral energies and to find background noise spectral peaks at which to place the notches of notch filter 4. A signal magnitude spectrum estimator, a stationary estimator 24, and background noise spectrum estimator, a running minimum estimator 22, for each frequency component are compared by a comparator 28 and various confidence levels are derived by a decision mechanism 32 for each frequency component as to whether or not the particular frequency component is primarily from noise or from signal-plus-noise. Based on these confidence levels, the gain for a frequency band is determined by a gain setter 34. The gains are then spread, by a spreading mechanism 36, in the frequency domain in critical bands, spectrally and temporally, exploiting psychoacoustic masking effects. A spectral valley filler 38 is used to detect spectral valleys in the frequency component gain function and fill in the valleys. The final frequency component gain function from noise compression spectral modifier 30 is used to modify the magnitude of the spectral components of the 512-point FFT at an attenuator 12. Note that the frame at attenuator 12 is one time unit behind the signals which are primarily used to generate the gains. An inverse FFT (IFFT) 14 then maps the signal back into the time domain from the frequency domain. The resulting 512 point frame of noise-reduced signal is multiplied by a window at a multiplier 16. The result is then overlapped and added, at adder 18, to the previous frame's signal to derive 20 milliseconds or 320 samples of output signal on line 40.

A more detailed description of each block in the signal processing chain is now provided, from input to output in the order of their occurrence.

As described above, the framed input signal is fed through a bank of notch filters 4.

Figure 2:
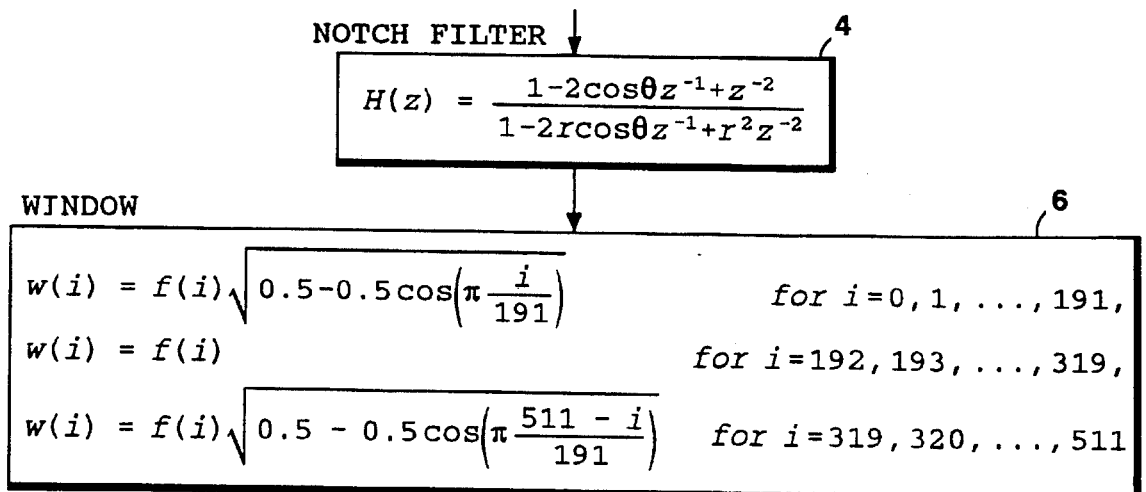

With reference to FIGS. 1 and 2, the notch filter bank 4 consists of a cascade of Infinite Impulse Response (IIR) digital filters, where each filter has a response of the form:

$$H(z) = \frac{1 - 2\cos\theta z^{-1} + z^{-2}}{1 - 2r\cos\theta z^{-1} + r^2 z^{-2}} \quad (1)$$

where $\theta = \pi/8000 \times$ (frequency of notch), and r is a value less than one which reflects the width of the notch. If the −3 dB width of the notch is $\omega$ Hz, then $r = 1 - (\omega/2)(\pi/8000)$. The bandwidth, $\omega$, used in the illustrated and preferred embodiment is 20 Hz. A notch is placed approximately every 100 Hz, at the largest peak of the background noise energy near the nominal frequency.

The notch filtering is applied to the 320 samples of the new signal frame. The resulting 320 samples of notch filtered output are appended to the last 192 samples of notch-filtered output from the previous frame to produce a total extended frame of 512 samples.

Referring to FIGS. 1 and 2, the notch-filtered 512 sample frame derived from filter bank 4 is multiplied by a window using the following formula:

$$w(i) = f(i) \sqrt{0.5 - 0.5\cos\left(\pi \frac{i}{191}\right)} \quad (2)$$
for $i = 0, 1, \ldots, 191$, $$w(i) = f(i) \quad \text{for } i = 192, 193, \ldots, 319,$$

$$w(i) = f(i) \sqrt{0.5 - 0.5\cos\left(\pi \frac{511-i}{191}\right)}$$
for $i = 320, 321, \ldots, 511$ where f(i) is the value of the ith notch-filtered sample of 512 sample frame from filter bank 4 and w(i) is the resultant value of the ith sample of the resultant 512 sample windowed output which is next fed to the FFT 8. The purpose of the window, effected by multiplier 6, is to minimize edge effects and discontinuities at the beginning and end of the extended frame.

The time-windowed 512 sample points are now fed to the FFT 8. Because of the ubiquity of FFT's, many Digital Signal Processing (DSP) chip manufacturer's supply highly optimized assembly language code to implement the FFT.

A one frame delay 10 is introduced so that signal frequency components of the FFT can be amplified and processed in attenuator 12 based upon later occurring signal values. This does not introduce any perceptual noise because, as noted above, a signal component will mask frequencies in its spectral neighborhood 20 milliseconds before it actually occurs. Also, since speech sounds gradually increase in volume starting from zero amplitude, the one frame delay prevents clipping the start of speech utterances.

Those components of the FFT due to noise are attenuated by attenuator 12, while those components due to signal are less attenuated or unattenuated or may be amplified. As noted above, for each frequency, there is a real and an imaginary component. Both components are multiplied by a single factor found from the Noise Suppression Spectral Modifier module 30, so that the phase is preserved for the frequency component while the magnitude is altered.

The inverse FFT 14 (IFFT) is taken of the magnitude modified FFT, producing a frequency processed extended frame, 512 samples in length.

The windowing operation used in multiplier 16 is exactly the same as the windowing operation defined above for multiplier 6. Its purpose is to minimize discontinuities introduced by the attenuation of frequency components. For example, suppose that all frequency components have been set to zero except for one. The result will be a sine wave when the IFFT is taken. This sine wave may start at a large value and end at a large value. Neighboring frames may not have this sine wave component present. Thus, without proper windowing, when this signal is overlap-added in the output adder 18, a click may be heard at the start and end of the frame. However, by properly windowing the sine wave, using, for example, the parameters defined in Equation 2, what will be heard is a sine wave smoothly increasing in magnitude and then smoothing decreasing in magnitude.

Because of the pre- and post-windowing of the frame by multipliers 6 and 16, overlap and addition of the frames is necessary to prevent the magnitude of the output from decreasing at the start and end of the frame. Thus, the first 192 samples of the present 512 sample extended and windowed frame are added to the last 192 samples of the previous extended and windowed frame. Then the next 128 samples (8 milliseconds) of the current extended frame is output. The last 192 samples of the present extended and windowed frame are then stored for use by the next frame's overlap-add operation, and so on.

In a preferred embodiment, the window function, W, used will have the property that:

$$W^2 + (W^2 \text{ shifted by amount of overlap}) = 1$$

to avoid producing modulation over time. For example, if the amount of overlap is one half a frame, then the windowing function, W, has the property that:

$$W^2 + (W^2 \text{ shifted by } \frac{1}{2}) = 1$$

Background Noise Estimator 20

Figure 3:
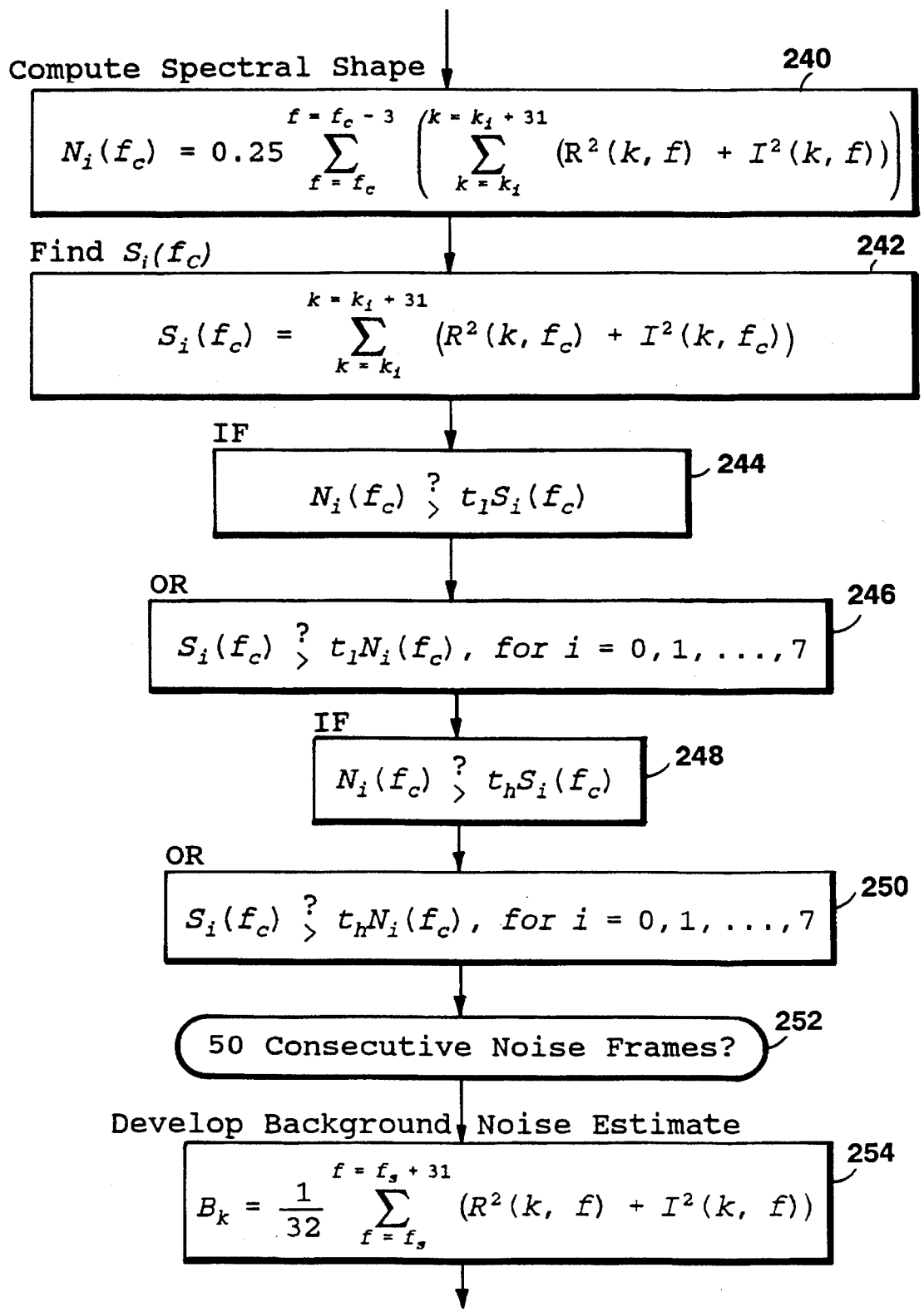
FIGS. 2–4 are detailed block diagrams implementing parts of the block diagram of FIG. 1.

Referring to FIGS. 1 and 3, the background noise estimator 20 and the noise suppression spectral modifier module 30 operate as follows.

The purpose of the background noise estimator 20 is to develop an estimate for each frequency component of the FFT, the average energy magnitude due to the background noise. The background noise estimator removes the need for the user to manually adjust or train the system for each new environment. The background noise estimator continually monitors the signal/noise environment, updating estimates of the background noise automatically in response to, for example, air conditioning fans turning off and on, etc. Two approaches are used, with the results of one or the other approach used in a particular situation. The first approach is more accurate, but requires one second intervals of solely background noise. The second approach is less accurate, but develops background noise estimates in 10 seconds under any conditions.

Stationary Estimator 24

With reference to FIGS. 1 and 3, the first approach uses a stationary estimator 24 to look for long sequences of frames where the spectral shape in each frame is very similar to that of the other frames. Presumably, this condition can only arise if the human in the room is silent and the constant background noise due to fans and/or circuit noise is the primary source of the signal. When such a sequence is detected, the average magnitude of each frequency is taken from those frames in the central part of the FFT sequence (frames at the beginning and end of the sequence may contain low level speech components). This method yields a much more accurate measurement of the background noise spectrum as compared to the second approach (described below), but requires that the background noise is relatively constant and that the humans in the room are not talking for a certain period of time, conditions sometimes not found in practice.

The operation of this estimator, in more detail, is as follows:

1. Referring to FIG. 3, the method in the first approach determines if the current 20 ms frame is similar in spectral shape to the previous frames. First, the method computes, at 240, the spectral shape of the previous frames:

$$N_i(f_c) = 0.25 \sum_{f=f_c}^{f=f_c-3} \left( \sum_{k=k_i}^{k=k_i+31} (R^2(k,f) + I^2(k,f)) \right) \quad (3)$$

where $f_c$ is the frame number for the current 20 ms frame (it advances by one for consecutive frames), i denotes a 1000 Hz frequency band, $k_i = i * 32$, k indexes the 256 frequency components of the 512 point FFT, and R(k, f) and I(k, f) are the real and imaginary components of the kth frequency component of the frame f.

2. Next, $S_i(f_c)$, the spectral shape of the current frame, is determined at 242:

$$S_i(f_c) = \sum_{k=k_i}^{k=k_i+31} (R^2(k,fC) + I^2(k,f_c)) \quad (4)$$

where the notation has the same meaning as in equation (3) above; and $S_i$ is the magnitude of the ith frequency component of the current frame, $f_c$.

3. The estimator 24 then checks, at 244 and 246, to determine whether $$N_i(f_c) > t_1 S_i(f_c) \quad (5)$$

or $$S_i(f_c) > t_1 N_i(f_c), \text{ for } i=0, 1, \ldots, 7 \quad (6)$$

where $t_1$ is a lower threshold. In a preferred embodiment, $t_1=3$. If the inequality in (5) or (6) is satisfied for more than four values of i, then the current frame $f_c$ is classified as signal; otherwise, the estimator checks (at 248 and 250) to determine whether $$N_i(f_c) > t_h S_i(f_c) \quad (7)$$

or $$S_i(f_c) > t_h N_i(f_c), \text{ for } i=0, 1, \ldots, 7 \quad (8)$$

where $t_h$ is a higher threshold, and $N_i$ designates the magnitude of the ith frequency component of the background noise estimate. In a preferred embodiment, $t_h=4.5$. If either inequality is satisfied for one or more values of i, then the current frame $f_c$ is also classified as a signal frame. Otherwise the current frame is classified as noise.

4. If fifty consecutive noise-classified frames occur in a row, at 252 (corresponding to one second of noise), then estimator 24 develops noise background estimates by summing frequency energies from the 10th to the 41st frame. By ignoring the beginning and ending frames of the sequence, confidence that the signal is absent in the remaining frames is increased. The estimator finds, at 254, $$B_k = \frac{1}{32} \sum_{f=f_s}^{f=f_s+31} (R^2(k,f) + I^2(k,f)) \quad (9)$$

where $k=0, 1, 2, \ldots, 255$, $f_s$ is the starting index of the 10th noise-classified frame, and the other terms have the same notation as in equation (3). The values, $B_k$, now represent the average spectral magnitude of the noise component of the signal for the kth frequency.

Figure 4:
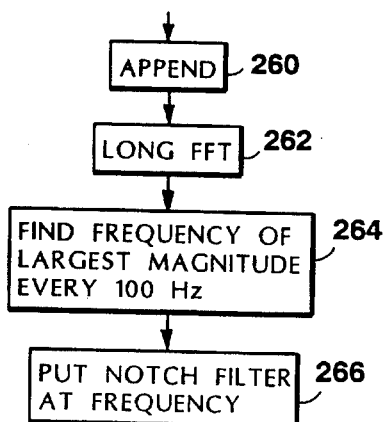

To determine where to place the notches of the notch filter bank, with reference to FIGS. 1 and 4, the unwindowed 20 ms time-domain samples corresponding to the 32 noise-only classified frames are appended together (at 260) to form a contiguous sequence. A long FFT is taken of the sequence (at 262). The component having the largest magnitude, approximately every 100 Hz, is found (at 264), and the frequency at which this locally maximum magnitude occurs corresponds to the location at which a notch center frequency will be placed (at 266). Notches are useful in reducing fan noise only up to 1500 Hz or so, because for higher frequencies, the fan noise spectrum tends to be fairly even with the absence of strong peaks.

Running Minimum Estimator 22

There will be some instances when either the speech signal is never absent for more than a second or the background noise itself is never constant in spectral shape, so that the stationary estimator 24 (described above) will never produce noise background estimates. For these cases, the running minimum estimator 22 will produce noise background estimates, albeit with much less accuracy.

The steps used by the running minimum estimator are:

1. Over a 10 second interval, and for each frequency component k, find the eight consecutive frames which minimize the energy of the eight consecutive frames for that frequency component; that is, for every frequency component k find the frame $f_k$ that minimizes $M_k(f_k)$ where $$M_k(f_k) = \frac{1}{8} \sum_{f=f_k}^{f=f_k+7} (R^2(k,f) + I^2(k,f)) \quad (10)$$

where $f_k$ is any frame number occurring within the 10 second interval. Note that, in general, the $f_k$ that minimizes equation (10) will take on different values for different frequency components, k.

2. Use the minimum values $M_k$ derived in the previous step as the background noise spectral estimate if the following two conditions are both met:
   (a) It has been more than 10 seconds since the last update of the background noise spectral estimate due to the Stationary Estimator.
   (b) The difference, D, between the past background noise estimate, which may have resulted from the Stationary Estimator or the Running Minimum Estimator, and the current Running Minimum Estimator is great. The metric used to define the difference D is given in Equation 11:

$$D = \sum_{k=0}^{k=255} \left( \max \left( \frac{M_k}{N_K}, \frac{N_K}{M_k} \right) - 1 \right)^2 \quad (11)$$

where the max function returns the maximum of its two arguments, and $N_k$ are the previous background noise estimates (from either Running Minimum or Stationary Estimators), and $M_k$ are the current background noise estimates from the Running Minimum Estimator.

If D is greater than some threshold, for example, 3,000 in a preferred embodiment, and the preceding condition (a) is satisfied, then $M_k$ is used as the new background spectral estimate. The use of $M_k$ as the noise estimate indicates that the notch filters should be disabled, since a good estimate of the notch center frequencies is not possible.

Noise Suppression Spectral Modifier 30

Referring to FIG. 1, once the background noise estimate has been found, the current frame's spectra must be compared to the background noise estimate's spectra, and on the basis of this comparison, attenuation must be derived for each frequency component of the current frame's FFT in an attempt to reduce the perception of noise in the output signal.

Global Speech versus Noise Detector 32

Any given frame will either contain speech or not. Global Speech versus Noise Detector 32 makes a binary decision as to whether or not the frame is noise.

In the presence of speech, thresholds, can be lowered because masking effects will tend to make incorrect signal versus noise declarations less noticeable. However, if the frame truly is noise only, slight errors in deciding whether or not frequency components are due to noise or signal will give rise to so-called "twinkling" sounds.

In accordance with the illustrated embodiment, to determine whether speech is present in a frame, the system compares the magnitude of the kth frequency component of the current frame, designated $S_k$, and the magnitude of the kth frequency component of the background noise estimate, designated $C_k$. Then if $S_k > T \times C$, for more than 7 values of k (for one frame), where T is a threshold constant (T=3, in a preferred embodiment), the frame is declared a speech frame. Otherwise, it is declared a noise frame.

Local Speech versus Noise Detector for Individual Frequency Components 34

The global speech versus noise detector 32 described in the previous section, which makes a binary decision as to whether or not each frequency component is noise. The local speech versus noise detector 34, on the other hand, produces a range of decisions as to whether or not each frequency component is noise. These decisions range from a highly confident decision that the kth frequency component is noise to a highly confident decision that the kth frequency component is signal.

The decisions are based on the ratio of the magnitude of the current frame's kth frequency component to the magnitude of the corresponding component of the background noise spectral estimate. Denote the decision as $D_k$. In this embodiment the decisions, $D_k$, range from 0 to 4, with a decision of Dk=0 corresponding to "highly confident that the component is noise" and a decision of $D_k=4$ corresponding to "highly confident that the component is signal". Then $$\text{if } \frac{S_k}{N_k} > t_4, \quad D_k = 4, \tag{12}$$

$$\text{else if } \frac{S_k}{N_k} > t_3, \quad D_k = 3,$$

$$\text{else if } \frac{S_k}{N_K} > t_2, \quad D_k = 2,$$

$$\text{else if } \frac{S_k}{N_k} > t_1, \quad D_k = 1,$$

$$\text{else} \quad D_k = 0$$

where $S_k = R^2(k) + I^2(k)$ for the current frame and $N_k$ is the background noise estimate for component k. The values used for $t_1, t_2, t_3, t_4$ vary depending on whether the global speech detector 32 has declared the previous frame to be speech or noise. For the noise case, in the illustrated embodiment, $t_1=6.3$, $t_2=9.46$, $t_3=18.9$, $t_4=25.2$ and for the signal case, the thresholds are lowered by factor of two to $t_1=3.15$, $t_2=4.73$, $t_3=9.45$, $t_4=12.6$.

The $D_k$'s are used in the following step to adjust the gain multiplicative factors for the controlled attenuator.

Temporal and Spectral Spreading of Frequency Bin Gains by Critical Bands 36

An array, denoted $A_k$, stores the multiplicative factors for every FFT frequency component k. The elements of $A_k$ will be used by the controlled attenuator 12 to modify the spectral components from the FFT 8 via the one-frame delay 10. The values of the $A_k$ are modified based on the decisions, $D_k$, made in the local speech versus noise detector 34.

$A_k$ is restricted in value to the range $L < A_k < 1$ where L is the bottom limit on the amount of noise reduction (as will be explained below). The smaller L is in value, the more noise reduction there can be. However, more noise reduction generally will be accompanied by more artifacts. The higher the Signal-to-Noise Ratio (SNR) of the signal, the lower L can be set without producing objectionable artifacts in the speech. A good value of L for a moderate SNR of 14 dB would be 0.25. The value of L should increase with lower SNR's to reduce objectionable artifacts which affect speech intelligibility. An SNR of 6 dB, for instance, would require L to be 0.5. The SNR of the speech is measured during the system operation, and the measurement is then used to determine the value of L.

$A_k$ changes with each new frame as a function of the $A_k$ in the previous frame and the value of $D_k$ of the current frame, as derived from Equation (12) above. Denote $A_k$ from the ith frame as $A_k^i$ then $A_k^i$ $G(A_k^{i-1}, D_k)$, where the function G is defined in Equation (13) below.

$$G(A_k^i, D_k) = \text{if } D_k = 0 \text{ then}$$

$$A_k^i = A_k^{i-1} \times \beta_0 \tag{13}$$

$$\text{if } D_k \geq 1 \text{ then}$$

$$A_k^i = A_k^{i-1} \times \beta_0$$

Where $\beta > 1$ and increases with $D_k$, and $\beta_o < 1$.

In other words, if the decision $D_k \geq 1$, then $A_k$ from the previous frame is multiplied by a multiplicative factor greater than 1 which increases with increasing value of $D_k$. If the decision $D_k=0$ then $A_k$ from the previous frame is multiplied by a multiplicative factor less than 1, typically 0.8 in value.

This is the temporal spreading. In a preferred embodiment temporal spreading exists from 20 ms before until 200 ms after the current frame.

A decision $D_k=4$ implies a high degree of confidence that the spectral component k contains a speech signal and $A_k$ is set to its maximum value, 1.

Next, spectral spreading of $A_k$ is executed for frequencies greater than 500 Hz. The spreading occurs over the critical bandwidth which, in this illustrated embodiment, equals ⅙ of the center frequency. The motivation for this is from psychoacoustic experiments which have shown that if there is a strong signal component at a given frequency, it will have masking effects for noise in a bandwidth of ⅙ of the frequency. The spectral spreading is accomplished in the following manner:

For decision values of $D_k < 1$, those $A_k$ in the critical bandwidth, which are calculated as described above, are not allowed to be less than $F(D_k)$ (F is defined below). In essence the lower limit L for $A_k$ in the critical bandwidth is increased, so that less noise (and speech) reduction is occurring in spectral regions. Typically, while L may equal 0.25, $F(D_k)$ is defined as:

F(4)=0.5
F(3)=0.4

F(2)=0.333

For frequencies less than 500 Hz there is no spectral spreading. Experimentally it has been shown that the background noise spectra has many peaks and valleys at low frequencies, due to rotational acoustics, and hoarse or rough artifacts result from any attempt at spectral spreading in those frequencies.

Spectral Valley Filler 38

One of the artifacts of the noise reduction scheme is that the perception of reverberance is increased, resulting from the fact that the depth of spectral nulls in the signal due to reverberance is increased in the process of deriving the gain multiplicative factor array $A_k$. To help combat this artifact, local minima in $A_k$, which may correspond to reverberance related spectral nulls, are increased in value. For the frequency range from 500 Hz on up, if $A_k < A_{k-4}$ and $A_k < A_{k+4}$ then $$A_k = \frac{A_{k-4} + A_{k+4}}{2} \quad (14)$$

Attenuator

Once the values of the multiplicative factor array are determined for a particular frame, the frequency components can be adjusted to reflect the noise-versus-speech decisions.

In the controlled attenuator 12, the multiplicative factor array, $A_k$, is used in the following manner. Each frequency component, real and imaginary, of the delayed transformed signal is scaled as follows:

for k=0, 1, 2, ..., 256

$$R_n(k) = A_k R(k) \quad (15)$$

$$I_n(k) = A_k I(k)$$

The modified Fourier components, $R_n(k)$ and $I_n(k)$, are then fed to the inverse FFT, Windowed and overlapped, finally producing the output noise-reduced signal frame, as shown in the block diagram of FIG. 1 and described.

Then results a more aesthetically pleasing and perceptually noise-reduced signal.

Additions, subtractions, deletions, and other modifications of the preferred particular embodiments of the invention will be apparent to those practiced in the art and are within the scope of the following claims.

What is claimed is:

1. An apparatus for the perceived real-time suppression of background noise in an input audio signal having components of noise comprising:

a framer for dividing the input audio signal into a sequence of audio signal frames;

a windower for producing a current windowed audio signal frame, combining all of one audio signal frame with some of the audio signal frame immediately preceding in time the one audio signal frame;

a transformer for obtaining a group of frequency spectrum components from the current windowed audio signal frame;

a noise estimator using the frequency spectrum components to produce a noise estimate of an amount of noise in the frequency spectrum components;

a noise suppression spectral modifier for producing current gain multiplicative factors based on the noise estimate and the frequency spectrum components;

a delayer for delaying, by a fixed number of frames, the frequency spectrum components of said sequence of audio signal frames to produce delayed frequency spectrum components;

a controlled attenuator for attenuating the delayed frequency spectrum components of a previous frame of said sequence based on the current gain multiplicative factors produced using said current frame to produce noise-reduced frequency components; and an inverse transformer for converting the noise-reduced frequency components to the time domain.

2. The apparatus of claim 1 further comprising:

a post-windower for producing smoothed time-domain components, for minimizing discontinuities in the noise-reduced time-domain components; said post-windower comprising an overlap-and-adder for outputting a first portion of the smoothed time-domain components from said inverse transformer in combination with a previously stored portion of smoothed time-domain components from a previous frame, and for storing a remaining portion of the smoothed time-domain components from said transformer, wherein the remaining portion comprises the smoothed time-domain components not included in the first portion.

3. The apparatus of claim 1 wherein said noise suppression spectral modifier further comprises means for using previously produced gain multiplicative factors for determining current gain multiplicative factors.

4. The apparatus of claim 1 wherein said noise suppression spectral modifier comprises:

means for effecting the behavior of a fast attack, slow decay filter in said temporal domain.

5. The apparatus of claim 1 further comprising a notch filter bank for removing narrow band components of noise from said audio signal frames to produce filtered audio signal frames.

6. An apparatus for the perceived suppression of background noise in an input audio signal having components of noise comprising:

a framer for dividing the input audio signal into a sequence of audio signal frames;

a windower for producing a current windowed audio signal frame, combining all of one audio signal frame with some of the audio signal frame immediately preceding in time the one audio signal frame;

a transformer for obtaining a group of frequency spectrum components from the windowed audio signal frame;

a noise estimator using the frequency spectrum components to produce a noise estimate of an amount of noise in the frequency spectrum components;

a noise suppression spectral modifier for producing current gain multiplicative factors based on the noise estimate and the frequency spectrum components;

a delayer for delaying the frequency spectrum components of said sequence of audio signal frames to produce delayed frequency spectrum components; a controlled attenuator for attenuating the delayed frequency spectrum components of a previous frame of said sequence based on the current gain multiplicative factors produced using said current frame to produce noise-reduced frequency components; and an inverse transformer for converting the noise-reduced frequency components to the time domain, and wherein the noise suppression spectral modifier further comprises:

means for using previously produced gain multiplicative factors for determining current gain multiplicative factors;

a global decision mechanism for making, for a group of the frequency spectrum components of a frame a determination as to whether that group is noise;

a local noise decision mechanism for deriving, for each frequency component of the frequency spectrum components, a confidence level for each component, whether that frequency component is a noise component;

a detector for determining, based on the confidence levels, initial gain multiplicative factors for each frequency component; and a spreading mechanism for spectrally and temporally effecting adjustment of the initial gain multiplicative factors.

7. The apparatus of claim 6 wherein the background noise estimator produces a corresponding noise estimate for each frequency spectrum component, and wherein the local noise decision mechanism derives confidence levels based on:

(a) ratios between each of the frequency components and a corresponding noise estimate of said frequency component, and (b) the determinations made by the global decision mechanism.

8. The apparatus of claim 7 wherein said background noise estimator further comprises:

means for comparing said ratios with selected thresholds, said thresholds being dependent upon whether a previous group was declared to be noise by said global decision mechanism.

9. The apparatus of claim 7 wherein multiplicative factors have a selected lower level value and said spreading mechanism further comprises:

means for increasing said lower level value for a frequency component of a group based upon a signal-to-noise measurement for said frequency component and said confidence level for said frequency component of said group.

10. The apparatus of claim 6 wherein the spreading mechanism adjusts the gain multiplicative factors based on the confidence levels.

11. The apparatus of claim 6 wherein said noise suppression spectral modifier further comprises:

a spectral valley filler for detecting and filling in spectral valleys in said frequency components.

12. The apparatus of claim 6 wherein said global decision mechanism further comprises:

means for comparing each frequency spectrum component with a corresponding noise estimate for said frequency component; and means for declaring a group as a speech frame when a selected number of said spectrum components exceed, by a selected threshold amount, said corresponding noise estimate.

13. The apparatus of claim 6 wherein said spreading mechanism as like a fast attack, slow decay filter, for rapidly increasing said multiplicative factor for a component and slowly allowing said multiplicative factor to diminish to a variable lower bound for said frequency component.

14. The apparatus of claim 6 wherein said spreading mechanism comprises:

means for adjusting said multiplicative factors, due to spectral spreading, only for frequencies greater than about 500 Hz.

15. An apparatus for the perceived suppression of background noise in an input audio signal having components of noise comprising:

a transformer for obtaining frequency spectrum components from an audio signal frame derived from the input audio signal;

a detector for determining multiplicative gain factors for each frequency component;

a spreading mechanism for adjusting the multiplicative gain factors for effecting temporal and spectral spreading; and a controlled attenuator for attenuating the frequency components in accordance with said adjusted multiplicative gain factors to derive a noise-modified spectral signal.

16. A method for reducing the perception of background noise of an input audio signal comprising the steps of:

dividing the input audio signal into a sequence of audio signal frames;

producing a windowed audio signal frame;

combining all of one audio signal frame with some of the audio signal frame immediately preceding in time the one audio signal frame to obtain a current frame;

obtaining a group of frequency spectrum components from the windowed audio signal frame;

using the frequency spectrum components to produce a noise estimate of an amount of noise in the frequency spectrum components;

producing current gain multiplicative factors based on the noise estimate and the frequency spectrum components;

delaying, by a fixed number of frames, the frequency spectrum components of said sequence to produce delayed frequency spectrum components;

attenuating the delayed frequency spectrum components of a previous frame based on the current gain multiplicative factors produced using said current frame to produce noise-reduced frequency components; and converting the noise-reduced frequency components to the time domain.

17. The method of claim 16 further comprising the step of:

post-windowing to produce smoothed time-domain components; and said post-windowing comprises the steps of:

outputting a first portion of the smoothed time-domain components from said step of converting in combination with a previously stored portion of smoothed time-domain components from a previous frame; and storing a remaining portion of the smoothed time-domain components, wherein the remaining portion comprises the smoothed time-domain components not included in the first portion.

18. The method of claim 16 wherein said step of producing current gain multiplicative factors comprises the step of using previously produced gain multiplicative factors for determining said current gain multiplicative factors.

19. A method for reducing the perception of background noise of an input audio signal comprising the steps of:

dividing the input audio signal into a sequence of audio signal frames;

producing a windowed audio signal frame;

combining all of one audio signal frame with some of the audio signal frame immediately preceding in time the one audio signal frame to obtain a current frame;

obtaining a group frequency spectrum components from the current windowed audio signal frame;

using the frequency spectrum components to produce a noise estimate of an amount of noise in the frequency spectrum components;

producing current gain multiplicative factors based on the noise estimate and the frequency spectrum components;

delaying the frequency spectrum components of said sequence to produce delayed frequency spectrum components;

attenuating the delayed frequency spectrum components of a previous frame based on the current gain multiplicative factors produced using said current frame to produce noise-reduced frequency components;

converting the noise-reduced frequency components to the time domain; and wherein the step of producing current gain multiplicative factors further comprises the steps of:

using previously produced gain multiplicative factors for determining said current gain multiplicative factors;

making, for a group of the frequency spectrum components of a frame, a determination as to whether that group is noise;

deriving, for each frequency component of the frequency spectrum components, a confidence level for each component, whether that frequency component is a noise component;

determining, based on the confidence levels, initial gain multiplicative factors for each frequency component; and spectrally and temporally effecting adjustment of the initial gain multiplicative factors.

20. The method of claim 19 wherein said step of producing current gain multiplicative factors further comprises the step of detecting and filling-in spectral valleys in said frequency components.

21. A method for reducing the perception of background noise in an input audio signal having components of noise comprising the steps of:

obtaining frequency spectrum components from an audio signal frame derived from the input audio signal;

determining multiplicative gain factors for each frequency component;

adjusting the multiplicative gain factors for effecting temporal and spectral spreading; and attenuating the frequency components in accordance with said adjusted multiplicative gain factors to derive a noise-modified spectral signal.

* * * * *

UNITED STATES PATENT AND TRADEMARK OFFICE
CERTIFICATE OF CORRECTION

PATENT NO. : 5,550,924

DATED : August 27, 1996

INVENTOR(S) : Brant M. Helf et al.

It is certified that error appears in the above-identified patent and that said Letters Patent is hereby corrected as shown below:

Col. 7, line 12, after "$R^2(k,$", please delete "fC", and replace with --$f_c$--.

Col. 9, line 21, please delete "$T \times C$,", and repalce with --$T \times C_k$--.

Col. 10, line 27, please delete "$A_k^i G(A_k^{i-1}, D_k)$" and replace with --$A_k^i = G(A_k^{i-1}, D_k)$--.

Col. 10, line 33, please delete "$\beta_0$", and replace with --$\beta$--.

Col. 10, line 58, please delete "$D_k<1$", and replace with --$D_k>1$--.

Col. 11, line 20, after the equation, please insert --for k = 16, 17, 18, ..., 251.--

Col. 11, line 24, after "Attenuator", please insert --12--.

Claim 6, Col. 13, line 5, after "frame", please insert --,--.

Signed and Sealed this

Tenth Day of February, 1998

Attest:

BRUCE LEHMAN

Attesting Officer

Commissioner of Patents and Trademarks